US012423420B2

(12) United States Patent
McSweeney et al.

(10) Patent No.: US 12,423,420 B2
(45) Date of Patent: Sep. 23, 2025

(54) SELECTIVE AUTOMATIC OVERRIDE OF A CONFIGURATION MANAGEMENT EXCLUSION WINDOW

(71) Applicant: Dell Products, L.P., Hopkinton, MA (US)

(72) Inventors: Paul McSweeney, Silversprings (IE); Aaron Twohig, Rathpeacon (IE); Aidan Hally, Fermoy (IE)

(73) Assignee: Dell Products, L.P., Hopkinton, MA (US)

( * ) Notice: Subject to any disclaimer, the term of this patent is extended or adjusted under 35 U.S.C. 154(b) by 118 days.

(21) Appl. No.: 18/593,874

(22) Filed: Mar. 2, 2024

(65) Prior Publication Data
US 2025/0278479 A1    Sep. 4, 2025

(51) Int. Cl.
G06F 21/55    (2013.01)
G06F 21/57    (2013.01)

(52) U.S. Cl.
CPC .......... *G06F 21/554* (2013.01); *G06F 21/577* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 11,874,929 B2 * | 1/2024 | Ramasamy | G06F 21/577 |
| 12,093,396 B2 * | 9/2024 | Serna | G06F 21/577 |
| 12,135,790 B2 * | 11/2024 | Sethi | G06F 21/577 |
| 12,360,968 B2 * | 7/2025 | O'Mahony | G06F 16/215 |
| 2006/0036736 A1 * | 2/2006 | Kitamura | H04L 67/1097 709/226 |
| 2016/0378993 A1 * | 12/2016 | McGee | G06F 21/577 726/25 |
| 2018/0375891 A1 * | 12/2018 | Juncker | H04L 63/104 |
| 2020/0162499 A1 * | 5/2020 | Alsharif | G06F 21/577 |
| 2021/0382997 A1 * | 12/2021 | Yi | G06F 21/577 |
| 2023/0131898 A1 * | 4/2023 | Willett | G06F 3/0482 707/803 |
| 2023/0385889 A1 * | 11/2023 | Ali | G06Q 30/0609 |
| 2024/0111874 A1 * | 4/2024 | Fleming | G06F 21/577 |
| 2024/0163306 A1 * | 5/2024 | Ramakrishnan | H04L 63/1433 |
| 2024/0193277 A1 * | 6/2024 | Manuel-Devadoss | G06F 21/552 |
| 2024/0330473 A1 * | 10/2024 | Srivastava | G06F 21/577 |
| 2024/0370568 A1 * | 11/2024 | Chen | G06F 21/577 |
| 2025/0156531 A1 * | 5/2025 | Seck | G06F 21/54 |

* cited by examiner

*Primary Examiner* — Michael Pyzocha
(74) *Attorney, Agent, or Firm* — Anderson Gorecki LLP

(57) ABSTRACT

A storage system management system contains an exclusion window override system that enables a user to automatically override an exclusion window when a severe security issue requires immediate action on the storage system. The exclusion window override system does not remove an exclusion window, but rather enables execution of an exception to the exclusion window only if a given configuration request is: (1) included within an allowed subset of management operations; (2) associated with a valid Common Vulnerabilities and Exposures (CVE) that has a severity level in excess of a select security threshold; and (3) directed to a storage volume used by an application that is vulnerable to the identified CVE. In response to a determination that all of (1), (2), and (3) are true, the exclusion window override is permitted. In response to a determination that any of (1), (2), or (3) is false, the configuration request is denied.

20 Claims, 7 Drawing Sheets

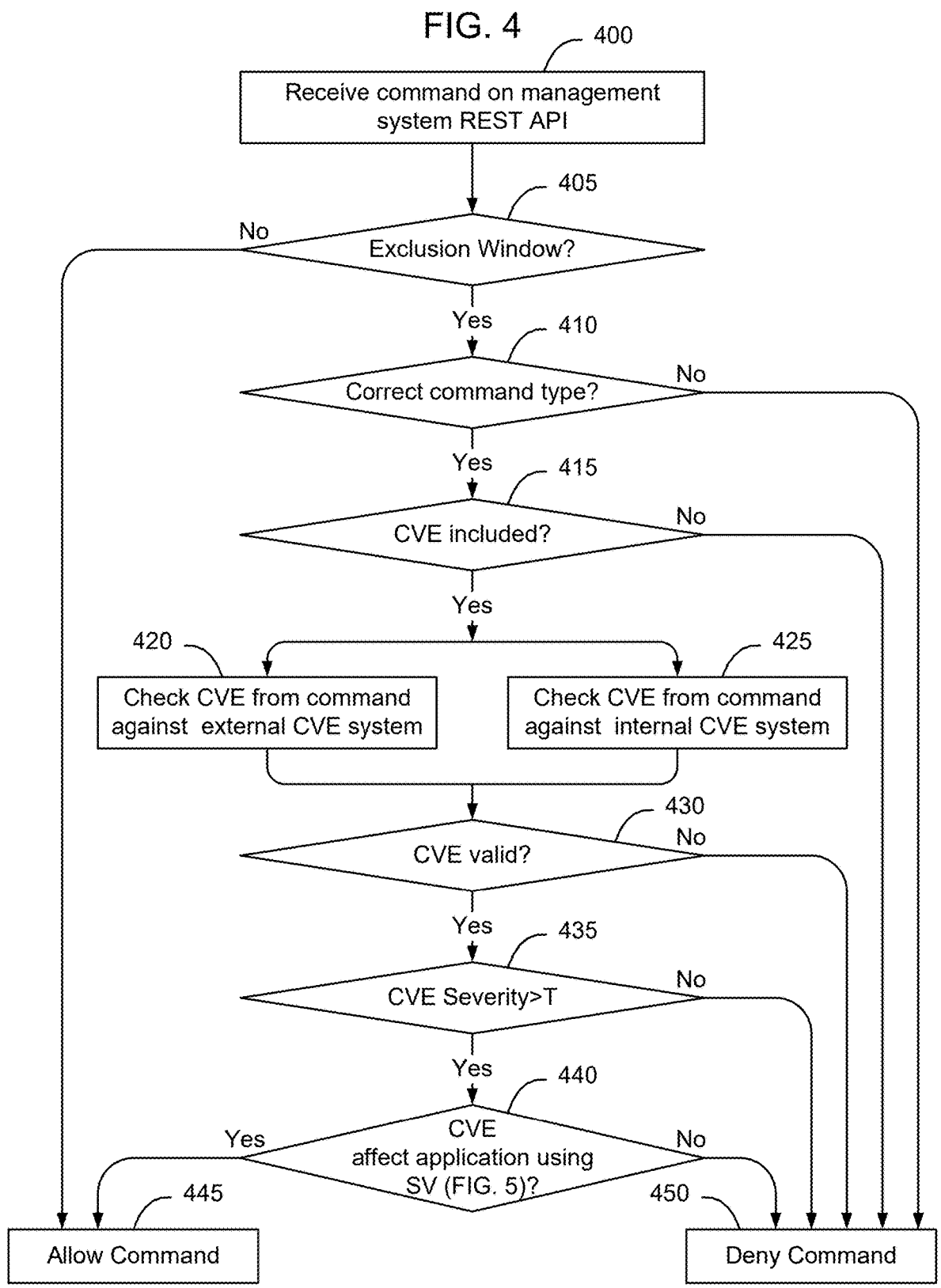

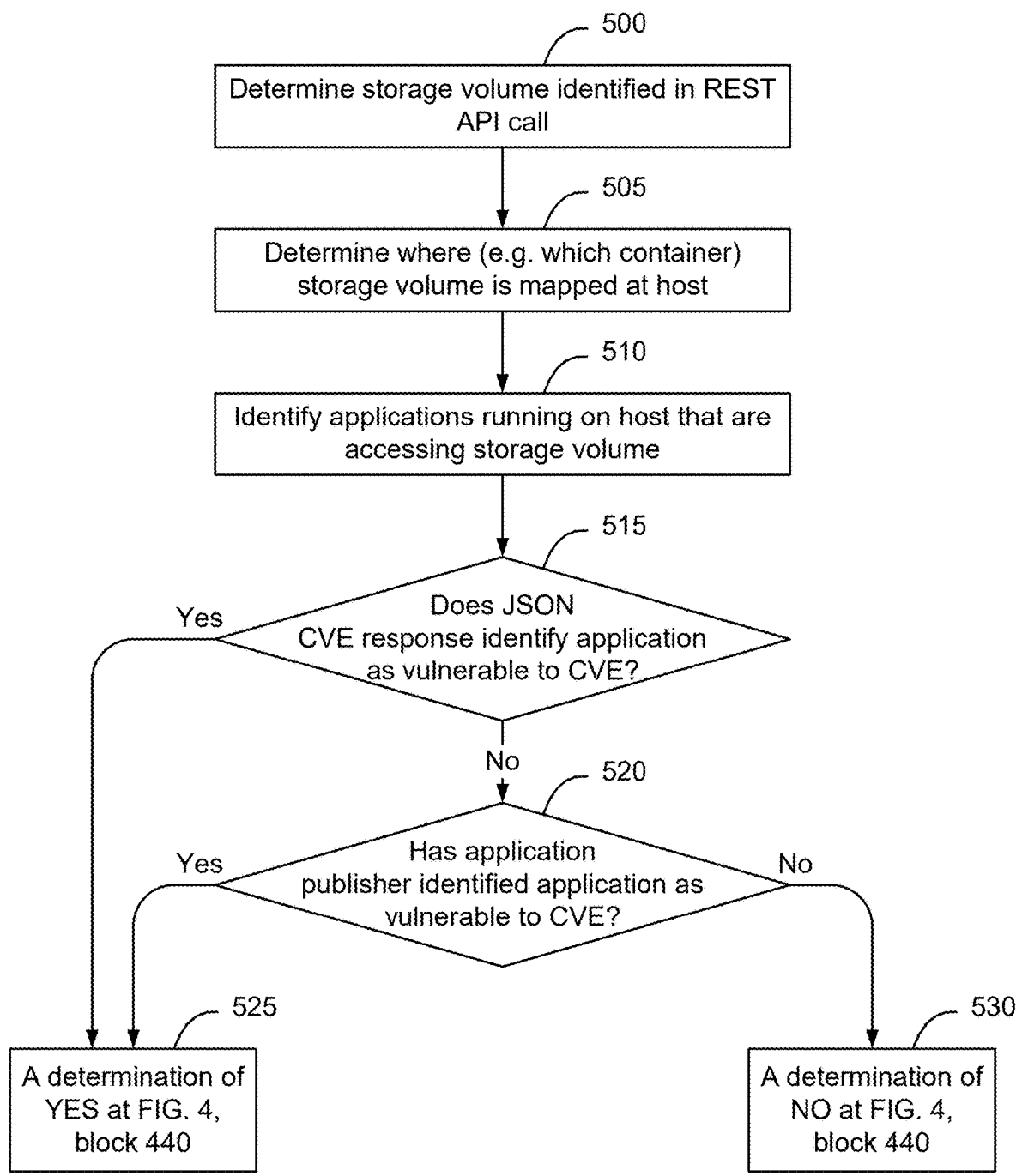

FIG. 6

```
JSON REST API request body – Example #1

{
  "editStorageGroupActionParam": {
    "expandStorageGroupParam": {
      "cve_id": "CVE-2023-12345",
      "addVolumeParam": {
        "emulation": "FBA",
        "volumeAttributes": [
          {
            "capacityUnit": "GB",
            "volume_size": "1",
            "num_of_vols": 1
          }
        ]
      }
    }
  }
}
```

323 → "cve_id": "CVE-2023-12345"

FIG. 7

```
JSON REST API request body – Example #2

{
  "editVolumeActionParam": {
    "expandVolumeParam": {
      "cve_id": "CVE-2023-12345",
      "volumeAttribute": {
        "capaictyUnit": "GB",
        "volumeSize": "5"
      }
    }
  }
}
```

323 → "cve_id": "CVE-2023-12345"

FIG. 8

JSON Request/Response for invalid CVE:

JSON CVE Request:

https://services.nvd.nist.gov/rest/json/cves/2.0?cveId=CVE-2021-4429999

JSON CVE Response:

{"resultsPerPage":0,"startIndex":0,"totalResults":0,"format":"NVD_CVE","version":"2.0","timestamp":"2023-11-07T11:47:32.860","vulnerabilities":[]}

FIG. 9

JSON Request/Response for valid CVE:

JSON CVE Request:

https://services.nvd.nist.gov/rest/json/cves/2.0?cveId=CVE-2019-1010218

JSON CVE Response:

{"resultsPerPage":1,"startIndex":0,"totalResults":1,"format":"NVD_CVE","version":"2.0","timestamp":"2023-11-07T11:34:37.343","vulnerabilities":

[{"cve":{"id":"CVE-2019-1010218","sourceIdentifier":"josh@bress.net","published":"2019-07-22T18:15:10.917","lastModified":"2020-09-30T13:40:18.163","vulnStatus":"Analyzed","descriptions":[{"lang":"en","value":"Cherokee Webserver Latest Cherokee Web server Upto Version 1.2.103 (Current stable) is affected by: Buffer Overflow - CWE-120. The impact is: Crash. The component is: Main cherokee command. The attack vector is: Overwrite argv[0] to an insane length with execl. The fixed version is: There's no fix yet."},

\* \* \*

A:H","attackVector":"NETWORK","attackComplexity":"LOW","privilegesRequired":"NONE","userInteraction":"NONE","scope":"UNCHANGED","confidentialityImpact":"NONE","integrityImpact":"NONE","availabilityImpact":"HIGH","baseScore":7.5,"baseSeverity":"HIGH"},"exploitabilityScore":3.9,"impactScore":3.6}],"cvssMetricV2":[{"source":"nvd@nist.gov","type":"Primary","cvssData":{"version":"2.0","vectorString":"AV:N/AC:L/Au:N/C:N/I:N/A:P","

\* \* \*

SELECTIVE AUTOMATIC OVERRIDE OF A CONFIGURATION MANAGEMENT EXCLUSION WINDOW

FIELD

This disclosure relates to computing systems and related devices and methods, and, more particularly, to a method and apparatus for enabling selective automatic override of a configuration management exclusion window.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a storage system management system contains an exclusion window override system configured to enable a user to selectively automatically override an exclusion window when a major security issue needs immediate attention, by allowing execution of a small subset of actions required to protect existing storage volumes. Example actions that might be allowed include increasing storage of a given storage volume, creating one or more new storage volumes to protect a given storage volume, or another action that doesn't decrease allocation of storage to a given storage volume. By providing selective automatic override of the exclusion window only for particular actions, it is possible to continue to block all other management actions during the exclusion window. Specifically, according to some embodiments, the exclusion window override system is not configured to remove an exclusion window, but rather is configured to enable execution of an exception to the exclusion window only if a given configuration request is: (1) included within an allowed subset of management operations; (2) associated with a valid Common Vulnerabilities and Exposures (CVE) that has a severity level in excess of a select security threshold; and (3) directed to a storage volume used by an application that is vulnerable to the identified CVE. In response to a determination that all of (1), (2), and (3) are true, the exclusion window override is permitted and the configuration request is automatically allowed to be implemented despite the continued existence and normal enforcement of the exclusion window. In response to a determination that any of (1), (2), or (3) is false, the configuration request is denied.

In some embodiments, a method of enabling selective automatic override of a configuration management exclusion window, the method includes receiving a request to implement a management operation directed to a storage volume hosted by a storage system, the storage volume being used by an application, and determining whether a storage system management exclusion window exists that currently prevents implementation of the management operation on the storage system. In response to determining that the storage system management exclusion window exists, the method includes determining whether the request includes a Common Vulnerabilities and Exposures (CVE) Identification (ID). In response to a determination that the request includes a CVE ID, the method includes evaluating a validity of the CVE ID against a CVE database. In response to a determination that the CVE ID is a valid CVE, the method includes evaluating a severity of the CVE. In response to a determination that the severity of the CVE exceeds a threshold severity, the method includes evaluating whether the application that is using the storage volume is affected by the CVE. In response to a determination that the CVE ID is not a valid CVE, that the severity of the CVE does not exceed the threshold severity, or that the application that is using the storage volume is not affected by the CVE, the method includes automatically denying override of the storage system management exclusion window to prevent implementation of the requested management operation. In response to a determination that the CVE ID is a valid CVE, the severity of the CVE exceeds the threshold severity, and that the application that is using the storage volume is affected by the CVE, the method includes automatically allowing override of the storage system management exclusion window to implement the requested management operation.

In some embodiments, the method further includes determining whether the management operation in the request is an additive command used to increase storage, and in response to a determination that the management operation is not an additive command, automatically denying override of the storage system management exclusion window to prevent implementation of the requested management operation. In some embodiments, additive commands include increasing a size of the storage volume, creating a new storage volume, or creating a snapshot copy of the storage volume.

In some embodiments, the storage system management exclusion window is a period of time during which a storage system management system is prevented from implementing configuration operations on a storage system. In some embodiments, automatically allowing override of the storage system management exclusion window include implementation of the management operation of the received request without requiring that a person submitting the request to the storage system management system have sufficient administrative privileges to authorize an override of the exclusion window.

In some embodiments, the CVE database is a public database that identifies, defines, and catalogs publicly disclosed cybersecurity vulnerabilities, and makes the database of known vulnerabilities available over the Internet, or the CVE database is a local copy of the public database. In some embodiments, evaluating the severity of the CVE include parsing a response from the CVE database to determining a CVE severity reported from the CVE database, and comparing the reported severity against the threshold. In some embodiments, the threshold is high severity.

In some embodiments, evaluating whether the application that is using the storage volume is affected by the CVE includes determining a type of a type of the application that is using the storage volume, and determining if a response from the CVE database identifies the application type as being susceptible to the CVE.

In some embodiments, evaluating whether the application that is using the storage volume is affected by the CVE further includes determining if a publisher of the application type has issued any notice identifying that the application as being susceptible to the CVE.

In some embodiments, a system for enabling selective automatic override of a configuration management exclusion window, includes one or more processors and one or more storage devices storing instructions that are operable, when executed by the one or more processors, to cause the one or more processors to perform operations including receiving a request to implement a management operation directed to a storage volume hosted by a storage system, the storage volume being used by an application, and determining whether a storage system management exclusion window exists that currently prevents implementation of the management operation on the storage system. In response to determining that the storage system management exclusion window exists, the operations includes determining whether the request includes a Common Vulnerabilities and Exposures (CVE) Identification (ID). In response to a determination that the request includes a CVE ID, the operations includes evaluating a validity of the CVE ID against a CVE database. In response to a determination that the CVE ID is a valid CVE, the operations includes evaluating a severity of the CVE. In response to a determination that the severity of the CVE exceeds a threshold severity, the operations includes evaluating whether the application that is using the storage volume is affected by the CVE. In response to a determination that the CVE ID is not a valid CVE, that the severity of the CVE does not exceed the threshold severity, or that the application that is using the storage volume is not affected by the CVE, the operations includes automatically denying override of the storage system management exclusion window to prevent implementation of the requested management operation. In response to a determination that the CVE ID is a valid CVE, the severity of the CVE exceeds the threshold severity, and that the application that is using the storage volume is affected by the CVE, the operations includes automatically allowing override of the storage system management exclusion window to implement the requested management operation.

In some embodiments, the operations further include determining whether the management operation in the request is an additive command used to increase storage, and in response to a determination that the management operation is not an additive command, automatically denying override of the storage system management exclusion window to prevent implementation of the requested management operation. In some embodiments, additive commands include increasing a size of the storage volume, creating a new storage volume, or creating a snapshot copy of the storage volume.

In some embodiments, the storage system management exclusion window is a period of time during which a storage system management system is prevented from implementing configuration operations on a storage system. In some embodiments, automatically allowing override of the storage system management exclusion window include implementation of the management operation of the received request without requiring that a person submitting the request to the storage system management system have sufficient administrative privileges to authorize an override of the exclusion window.

In some embodiments, the CVE database is a public database that identifies, defines, and catalogs publicly disclosed cybersecurity vulnerabilities, and makes the database of known vulnerabilities available over the Internet, or the CVE database is a local copy of the public database. In some embodiments, evaluating the severity of the CVE include parsing a response from the CVE database to determining a CVE severity reported from the CVE database, and comparing the reported severity against the threshold. In some embodiments, the threshold is high severity.

In some embodiments, evaluating whether the application that is using the storage volume is affected by the CVE includes determining a type of a type of the application that is using the storage volume, and determining if a response from the CVE database identifies the application type as being susceptible to the CVE.

In some embodiments, evaluating whether the application that is using the storage volume is affected by the CVE further includes determining if a publisher of the application type has issued any notice identifying that the application as being susceptible to the CVE.

BRIEF DESCRIPTION OF THE DRAWINGS

FIG. 4 is a flow chart of an example exclusion window override request evaluation process implemented by the exclusion window override system of FIG. 3 to enable selective automatic override of a configuration management exclusion window, according to some embodiments.

FIG. 5 is a flow chart of an example process of determining whether the CVE identified in the exclusion window override request affects an application using the storage volume identified in the REST API call, according to some embodiments.

FIGS. 6 and 7 are example exclusion window override requests implemented as REST API calls that are configured to be used to enable selective automatic override of a configuration management exclusion window, according to some embodiments.

FIG. 8 shows an example JSON request and JSON response from a public vulnerability database, when the CVE included in the JSON request is an invalid CVE.

FIG. 9 shows an example JSON request and a portion of a JSON response from a public vulnerability database, when the CVE included in the JSON request is a valid CVE.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
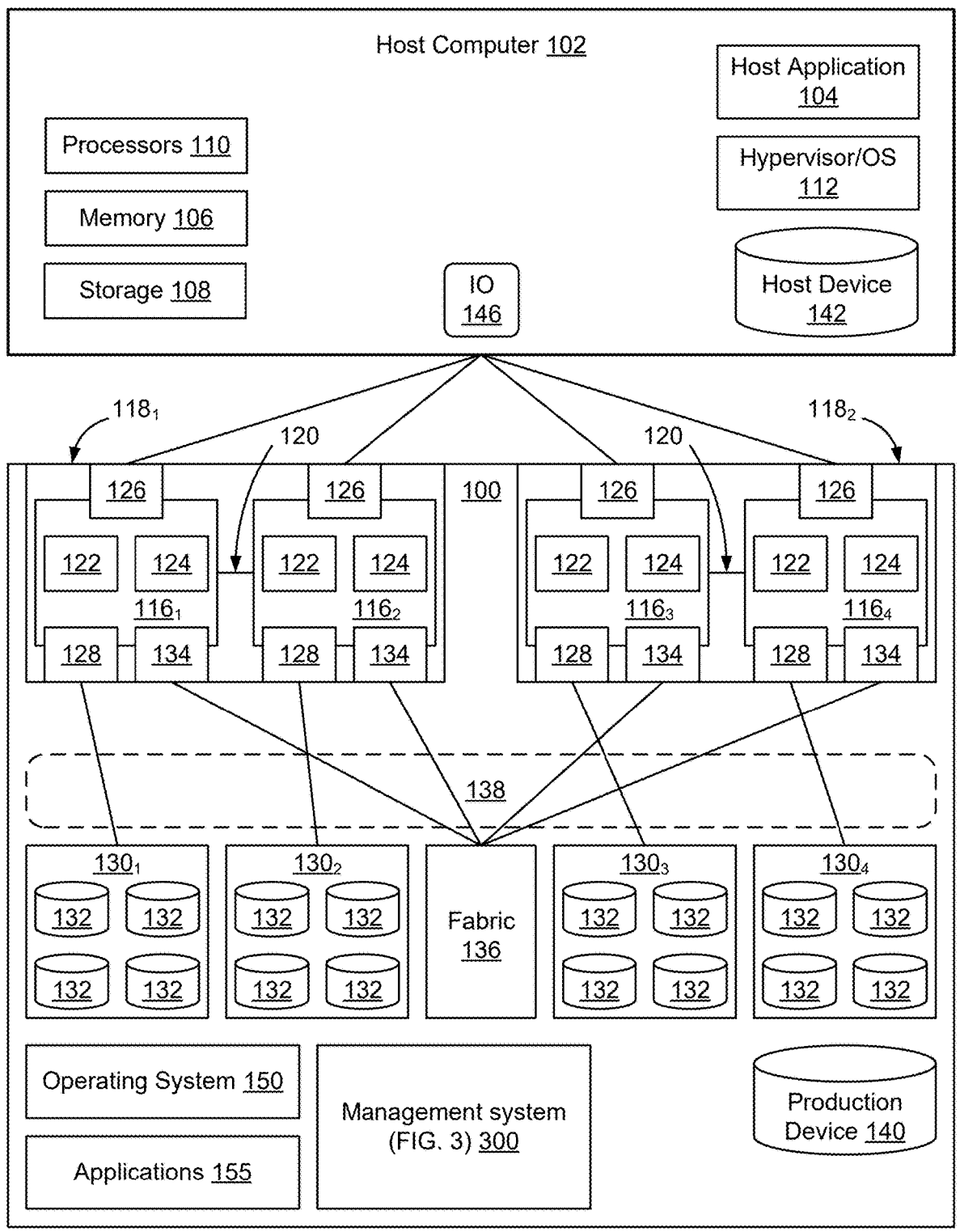
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a global memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible, then the IO 146 is sent to one of the compute nodes 116 to be serviced by the storage system 100.

In the case where IO 146 is a read command, the storage system 100 uses metadata to locate the commanded data, e.g., in the global memory 138 or on managed drives 132. If the commanded data is not in the global memory 138, then the data is temporarily copied into the global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the global memory 138, marks the data as dirty, and creates new metadata that maps the address of the data on the production device 140 to a location to which the block is written on the managed drives 132.

Figure 2:
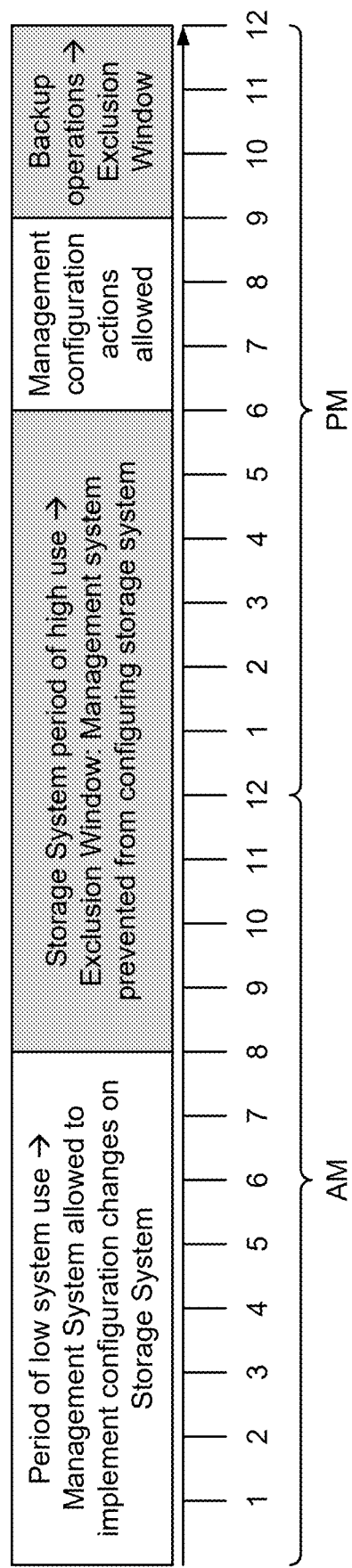
FIG. 2 is a block diagram of a timeline showing several example exclusion windows during which management operations are prevented from being implemented on a storage system, according to some embodiments.

Companies rely on having access to storage systems such as the storage system described in connection with FIG. 1 for many daily operations. Maintenance operations and configuration changes to the storage system can disrupt this access and, accordingly, it is common to implement exclusion windows during which configuration-related changes to the storage system cannot occur. Management operations often involve reconfiguring storage resources and/or moving data between storage resources, which can consume many resources including processing (CPU cycles), global memory, back-end storage, fabric, and other resources. Accordingly, by implementing a management system exclusion window during the hours of peak usage, it is possible to ensure that these types of operations are implemented during periods when the storage system is not experiencing as much demand from hosts FIG. 2 contains an example timeline showing several example exclusion windows during which the storage system management system is prevented from implementing configuration operations on a storage system, according to some embodiments. In the example timeline shown in FIG. 2 there are two example exclusion windows. In particular, as shown in FIG. 2, during peak usage hours it may be desirable to prevent management operations from being implemented on the storage system to thereby ensure maximal access to the storage system resources. In the timeline shown in FIG. 2, this first management system exclusion window has been shown as existing from 8 AM till 6 PM, although it should be understood that this is merely one example and that an actual management system exclusion window may be implemented for whatever duration of time is desired.

In the example shown in FIG. 2, there is also a second exclusion window that is shown as existing from 9 PM till 12 PM. The second exclusion window is implemented in this example during a period of time when the storage system is scheduled to implement backup operations. Backup operations may include a period of intense IO operations on the storage system during which time the storage volumes may be heavily accessed. By implementing an exclusion window it is possible to prevent changes from being made to the storage volumes until after the backup operations on the storage volumes has been completed. There are many reasons for creation of exclusion windows and the two example exclusion windows shown in FIG. 2 are merely intended to provide two examples.

If an emergency security issue occurs during an exclusion window, such as identification of a cyber vulnerability, it may be necessary to take immediate action on the storage system even if there are certain restrictions in place. For example, it may be necessary to create new storage volumes to enable existing storage volumes to be copied or otherwise backed-up. Accordingly, having the ability to react immediately to high-risk security problems reported by Common Vulnerabilities and Exposures (CVEs), is important to organizations. However, if the CVE is identified during an exclusion window, where no configuration changes are allowed to occur on the array, creating the required additional storage or implementing the necessary backup operations would require an exclusion window override, which often is only able to be implemented by someone with sufficient privileges to take that action. In the event that no qualified person is available, this can delay implementation of the necessary protective measures.

According to some embodiments, a storage system management system 300 contains an exclusion window override system 325 configured to enable a user to selectively automatically override an exclusion window only in connection with several positive actions such as the addition of more storage to a given storage volume or to protect storage volumes when a major security Common Vulnerability and Exposure (CVE) issue needs immediate attention. By providing selective automatic override of the exclusion window only for particular actions, it is possible to continue to block all other actions during the exclusion window. Specifically, according to some embodiments, the exclusion window override system is not configured to remove an exclusion window, but rather is configured to enable execution of one or more management operations as an exception to the exclusion window only if a given configuration request is: (1) included within an allowed subset of management operations; (2) associated with a valid CVE that has a severity level in excess of a select security threshold; and (3) directed to a storage volume used by an application that is vulnerable to the identified CVE. In response to a determination that all of (1), (2), and (3) are true, the exclusion window override is permitted and the configuration request is automatically allowed to be implemented despite the continued existence and normal enforcement of the exclusion window. By enabling "automatic implementation" of the requested command, it is possible for someone to take corrective action on the storage system despite not having sufficient administrative privileges to otherwise authorize an override of the exclusion window. In response to a determination that any of (1), (2), or (3) is false, the configuration request is denied.

According to some embodiments, the storage system management system includes a Representational State Transfer (REST) API configured to receive REST API calls. Although some embodiments are described in connection with a REST API, it should be understood that other forms of APIs may be used as well depending on the implementation. According to some embodiments, REST API calls that are submitted on the REST API during an exclusion window are required to include a Common Vulnerability and Exposure (CVE) number if they are to be used to override the exclusion window. Any REST API call submitted on the REST API during the exclusion window that does not include the CVE number is rejected by the storage system management application as untimely. Depending on the implementation, the storage system management application might respond with the reason for not implementing the requested operation and optionally may queue the requested operation for execution upon expiration of the exclusion window. In some embodiments, inclusion of a CVE number in a REST API call is sufficient to cause the storage system management application to evaluate whether the call should be executed on the storage system despite the existence of an exclusion window.

Figure 3:
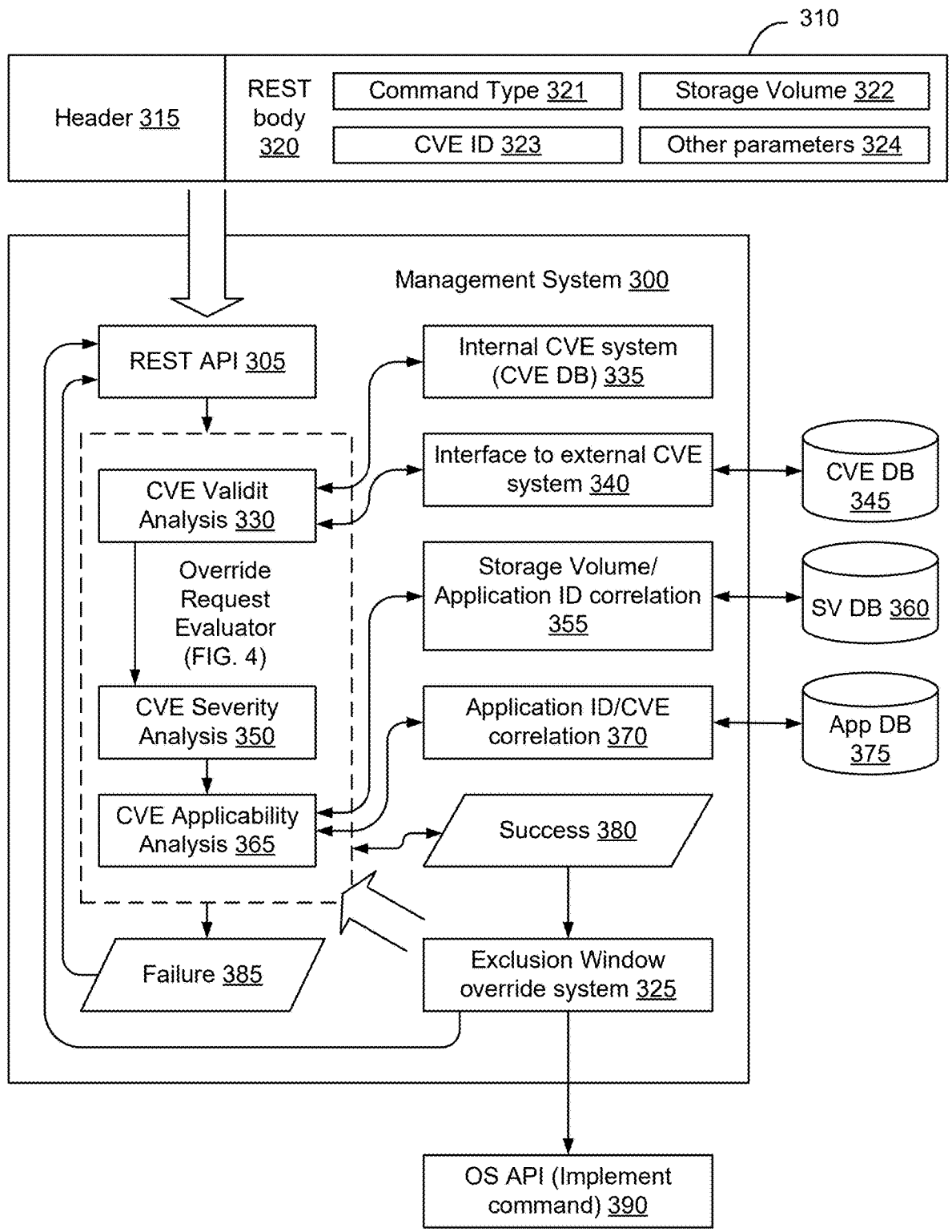
FIG. 3 is a block diagram of an example management system containing an exclusion window override system configured to enabling selective automatic override of a configuration management exclusion window, according to some embodiments.

FIG. 3 is a block diagram of an example management system containing an exclusion window override system configured to enabling selective automatic override of a configuration management exclusion window, according to some embodiments. As noted above, in particular instances it would be advantageous to enable particular actions to be taken during an exclusion window, for example to enable an immediate response in connection with a high severity cybersecurity threat identified as affecting one or more of the applications utilizing one or more of the storage volumes hosted by the storage system.

As shown in FIG. 3, according to some embodiments the storage system management system 300 includes an API 305 which, in the illustrated example, is a REST API 305. A REST API call 310 is presented to the management system 300 which includes a header 315 and a REST body 320. In some embodiments, the body 320 includes an indication of the command type 321, the storage volume 322 that is the target of the command, a CVE ID 323, and optionally other parameters 324. In instances where the CVE ID 323 is not present, the management system 300 does not treat the REST API call 310 as a request to override the exclusion window.

In instances where the CVE ID 323 is present, according to some embodiments the REST API call 310 is passed to an exclusion window override system 325 for evaluation to determine if the parameters (321, 322, 323) are such that the exclusion system window override system 325 should allow automatic implementation of the request despite the existence of the exclusion window. As used herein, the term "automatic implementation" is used to describe implementation of a management operation, without requiring that the person submitting the request have sufficient administrative privileges to authorize an override of the exclusion window.

As shown in FIG. 3, in some embodiments the exclusion window override system 325 includes a CVE validity analysis subsystem 330, a CVE severity analysis subsystem 350, and a CVE applicability analysis subsystem 365. Some additional details regarding processes implemented by the CVE validity analysis subsystem 330, the CVE severity analysis subsystem 350, and the CVE applicability analysis subsystem 365 are provided in connection with the description of FIGS. 4 and 5.

As shown in FIG. 3, in some embodiments the CVE validity analysis subsystem 330 is configured to check the CVE ID 323 against an internal CVE system 335, or in instances where the management system 300 has access to the Internet, the CVE ID 323 may be forwarded over an interface to an external CVE system 340 to be evaluated against an external CVE database 345. The CVE validity analysis subsystem determines if the CVE ID 323 contained in the REST API call is a valid CVE ID.

In instances where the CVE ID 323 is valid, the response will include an indication of the CVE severity. Accordingly, in some embodiments the exclusion window override system includes a CVE severity analysis subsystem 350 that evaluates the severity of the identified CVE. In some embodiments the CVE validity analysis subsystem and CVE severity analysis system are implemented as a single system.

In some embodiments the exclusion window override system 325 includes a CVE applicability analysis subsystem 365. In some embodiments the CVE applicability analysis subsystem interacts with a storage volume/application ID correlation system 355 which optionally interacts with a storage volume database 360 to identify a set of computer applications running on the host 102 that are accessing the storage volume 322 identified in the REST API call. The CVE applicability analysis subsystem 365 also interacts with an application ID/CVE correlation, which optionally interacts with an external application database 375 to determine whether any of the applications that are accessing the storage volume 322 identified in the REST API call are affected by the CVE ID 323.

In response to a determination that the command type 321 is in a class of commands that are allowed to be executed during an exclusion window, and in response to a determination that the CVE is valid, severe, and known to affect the application that is using the storage volume, the exclusion window override system 325 determines "success" 380 and implements the requested operation via the OS API 390. In all other instances the exclusion window override system 325 determines "failure" 385 and does not implement the requested operation.

FIG. 4 is a flow chart of an example exclusion window override request evaluation process implemented by the exclusion window override system of FIG. 3 to enable selective automatic override of a configuration management exclusion window, according to some embodiments. As shown in FIG. 4, in some embodiments when a command is received on the management system REST API that specifies an action to be taken on a storage volume (block 400), a determination is made as to whether there currently is an exclusion window in place that would otherwise block execution of the command (block 405). In response to a determination that execution of configuration changes on the storage system is not blocked by implementation of an exclusion window (a determination of NO at block 405), the command is allowed (block 445).

In response to a determination that execution of configuration changes on the storage system is currently blocked by implementation of an exclusion window (a determination of YES at block 405), the command is evaluated to determine if the command is a command selected from a small subset of commands that might be allowed despite the fact that an exclusion window is currently in effect (block 410). In some embodiments, the small subset of commands that might be allowed are all related to commands that are additive to the current storage configuration in place on the storage system. As used herein, "additive" commands are used to increase storage. Example additive commands might be to increase the size of an existing storage volume, to create a new storage volume, or create a snapshot of an existing storage volume. Additive commands do not reduce storage that is currently allocated on the system. Thus, additive commands cannot be used to reduce the size of a storage volume, eliminate a storage volume, move a given storage volume to a different storage group, etc. By constraining the subset of allowed commands to a specified subset of commands that are deemed to be additive commands, it is possible to prevent reduction of allocated storage or other reconfiguration of allocated storage during exclusion windows to thereby ensure the consistency of existing storage is not affected by an exclusion window override.

As shown in FIG. 4, in response to a determination that the command that was received in block 400 is not of the correct command type (a determination of NO at block 410), execution of the command is blocked due to the presence of the exclusion window (block 450).

In response to a determination that the command that was received in block 400 is of the correct command type (a determination of YES at block 410), the command is evaluated to determine if the command includes a CVE identifier (block 415). In response to a determination that the command that was received in block 400 does not include a CVE identifier (a determination of NO at block 415), execution of the command is blocked due to the presence of the exclusion window (block 450).

In response to a determination that the command that was received in block 400 includes a CVE identifier (a determination of YES at block 415), the CVE identifier is checked against either an external CVE system (block 420) or internal CVE system (block 425) and the CVE ID is evaluated to determine if the CVE is valid (block 430). In response to a determination that the CVE ID is not valid (a determination of NO at block 430), execution of the command is blocked due to the presence of the exclusion window (block 450).

As described in greater detail herein, in some embodiments if a REST API call includes a CVE number, the exclusion window override system 385 will verify the CVE number against a local copy of CVEs and/or will verify the CVE number against a public vulnerability database such as https://www.cve.org or https://nvd.nist.gov.

Common Vulnerabilities and Exposures (CVE) identifiers are identifiers assigned to publicly known information-security vulnerabilities in publicly released software packages. By using consistent identifiers, it is possible for organizations to easily share data as vulnerabilities are discovered. The CVE Program identifies, defines, and catalogs publicly disclosed cybersecurity vulnerabilities, and makes the database of known vulnerabilities available over the Internet at https://www.cve.org. The US National Vulnerability Database is the U.S. Government repository of standards based vulnerability management data represented using the Security Content Automation Protocol (SCAP), which is available at https://nvd.nist.gov. Both resources may be used to obtain JSON representations of the vulnerabilities. In instances where the storage system has Internet access, the CVE may be checked against one or more of these external CVE databases (block 420). In instances where the storage system does not have Internet access, one or more of these databases may be downloaded and stored at a location accessible to the storage system management system to enable the validity and severity of the CVE to be determined locally (block 425).

In response to a determination that the CVE ID is valid (a determination of YES at block 430), the severity of the CVE is determined (block 435). In some embodiments, the severity of the CVE specified in the JSON CVE response is compared with a threshold T. In response to a determination that the severity of the CVE is not sufficiently high, e.g., the listed severity is less than the threshold T (a determination of NO at block 435), execution of the command is blocked due to the presence of the exclusion window (block 450).

In response to a determination that the severity of the CVE is sufficiently high, e.g., the listed severity is greater than or equal to the threshold T (a determination of YES at block 435), a determination is made as to whether the CVE affects an application that is using the storage volume specified in the command that was received in block 400 (block 440). If the CVE does not affect any application that is using the identified storage volume, it is not necessary to implement the command in response to the identified CVE. Accordingly, in response to a determination that CVE does not affect an application using the identified storage volume (a determination of NO at block 440), execution of the command is blocked due to the presence of the exclusion window (block 450). In response to a determination that CVE affects an application using the identified storage volume (a determination of YES at block 440), execution of the command is allowed, despite the presence of the exclusion window (block 445).

Although FIG. 4 shows an example process in which various steps are described as being implemented in a particular order, it should be understood that the order of the steps may be changed depending on the implementation. For example, the order of blocks 410 and 415 may be changed depending on the implementation. Likewise, the order in which the CVE is evaluated (blocks 420, 425, 430, 435, and 440) may be changed, depending on the implementation. By determining that the CVE is valid and sufficiently severe, commands that are intended to override the implementation of the exclusion window must be related to a relatively important security situation to be automatically executed on the storage system during an exclusion window. Further, by ensuring that the CVE affects an application that is using the identified storage volume, it is possible to prevent someone from simply using the same known severe CVE identifier to override the exclusion window regardless of whether the known severe CVE actually poses a threat to any of the applications that are using the storage volumes of the storage system.

FIG. 5 is a flow chart of an example process of determining whether the CVE identified in the exclusion window override request affects an application using the storage volume identified in the REST API call (of FIG. 4, block 440), according to some embodiments. As shown in FIG. 5, just because a CVE is determined to be of high severity, doesn't mean that the CVE necessarily warrants override of the exclusion window. For example, there may be many high severity CVEs that have nothing to do with the applications that are using the storage volume. If the application that is using the storage volume is not affected by the CVE, it doesn't matter how severe the CVE is, because the particular CVE is not likely to affect the data contained in the storage volume and, hence, does not warrant automatic override of the exclusion window.

Accordingly, as shown in FIG. 5, in some embodiments the exclusion window override system 325 determines the storage volume identified in the REST API call (block 500) and determines where the storage volume is mapped on the host, e.g., which virtual machine or container (block 505), and determines which application are executing at that location (block 510). In some embodiments, an application such as Dell™ PowerPath™ is used to determine which application at the host is using a particular storage volume on the storage system. There are many ways to implement the step of determining which application is using a particular storage volume (block 510), depending on the implementation.

A determination is then made as to whether the application that is using the identified storage volume is affected by the CVE identified in the REST API call. In some instances, the CVE response received in connection with the CVE check (FIG. 4, block 420, or block 425) will identify a particular application or class of applications that are affected by the CVE (block 515). For example, when a CVE is first identified and reported to the CVE system, the CVE report may include an identification of an application or class of applications affected by the CVE. Accordingly, in those instances, when the CVE is indexed into the CVE database, that known application specific vulnerability may be included in the CVE description that is contained in the CVE database and provided as a response to the CVE inquiry. Accordingly, the CVE database response may be evaluated (block 515) to determine if the application that is using the storage volume is identified in the CVE response as being vulnerable to the CVE (block 515). Additionally, application publishers periodically identify vulnerabilities in the software packages that they publish, and will issue notices identifying particular vulnerabilities, including CVE IDs, that are applicable to particular applications (block 520). To do this, the exclusion window override system will use the application identified in block 510 to determine if the publisher of the application has issued any notice identifying that the application is susceptible to the CVE ID.

In some embodiments, the exclusion window override system checks both the CVE report (block 515) and publicly available lists of CVEs issued by the application publisher for the particular application to determine if the CVE is applicable to the application (block 520). Either a determination of YES at block 515 OR a determination of YES at block 520 will result in a determination of YES at FIG. 4, block 440. Both a determination of NO at block 515 AND a determination of NO at block 520 will result in a determination of NO at FIG. 4, block 440.

FIGS. 6 and 7 are example exclusion window override requests implemented as REST API calls that are configured to be used to enable selective automatic override of a configuration management exclusion window, according to some embodiments. In example #1 shown in FIG. 6, the JSON REST API request body includes a request to edit a storage group, namely, to expand an identified storage group by adding a storage volume. This is an "additive" command type and hence would be allowed in block 410. The command includes a CVE ID 323, and hence would be allowed in block 415. The CVE ID would then be evaluated at blocks 430, 435, and 440, to determine whether the command should be implemented despite the presence of an exclusion window.

Example #2, shown in FIG. 7, similarly includes a request to edit a storage group, namely, to expand an identified storage group by increasing the size of an existing storage volume. This is an "additive" command type and hence would be allowed in block 410. The command includes a CVE ID 323, and hence would be allowed in block 415. The CVE ID would then be evaluated at blocks 430, 435, and 440, to determine whether the command should be implemented despite the presence of an exclusion window.

FIG. 8 shows an example JSON request and JSON response from a public vulnerability database, when the CVE included in the JSON exclusion window override request contains an invalid CVE. As shown in FIG. 8, when an invalid CVE is presented to the public vulnerability database, the JSON response received from the public vulnerability database will indicate that the CVE was not located, e.g., by including a phrase such as "resultsPerPage": 0.

FIG. 9 shows an example JSON request and a portion of a JSON response from a public vulnerability database, when the CVE included in the JSON request is a valid CVE. As shown in FIG. 9, when the CVE is determined by the public vulnerability database to be a valid CVE, any information contained in the public vulnerability database will be returned in the form of a JSON CVE response. The example JSON CVE response shown in FIG. 9 is not a complete response—in FIG. 9 portions of the JSON CVE response that have been omitted are identified by the three stars (* * *).

As shown in FIG. 9, in some embodiments, the JSON CVE response includes an indication of the severity of the CVE. For example, in FIG. 9 the JSON CVE response includes a parameter "baseScore" which in this example is identified as 7.5 out of 10, and a "baseSeverity":"High". In some embodiments, the "baseScore" and "baseSeverity" are used in block 435 of FIG. 4 to determine whether the CVE severity is greater than the threshold T for overriding the exclusion window. In some embodiments, if the severity of the CVE is not in excess of a given threshold, such as if the CVE is determined to not have a "high" severity, an override of the exclusion window is not warranted and the request to override the exclusion window will be denied.

By permitting automatic override of a storage system management system exclusion window to enable automatic implementation of a particular small set of additive actions on the storage system, it is possible to automatically implement protective actions despite the existence of a storage system management exclusion window. By narrowly tailoring the administrative actions to additive actions, it is possible to prevent any actions from being implemented that might reduce or otherwise negatively affect an application's access to currently provisioned storage. By further narrowly tailoring the administrative actions to known security vulnerabilities that are sufficiently severe and known to affect an application that is using a storage volume that is the target of the additive action, it is possible to prevent most administrative actions while automatically allowing immediate corrective actions to be implemented despite the existence of the storage system management exclusion window.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of enabling selective automatic override of a configuration management exclusion window, the method comprising:
   receiving a request to implement a management operation directed to a storage volume hosted by a storage system, the storage volume being used by an application;
   determining whether a storage system management exclusion window exists that currently prevents implementation of the management operation on the storage system;
   in response to determining that the storage system management exclusion window exists, determining whether the request includes a Common Vulnerabilities and Exposures (CVE) Identification (ID);
   in response to a determination that the request includes a CVE ID, evaluating a validity of the CVE ID against a CVE database;
   in response to a determination that the CVE ID is a valid CVE, evaluating a severity of the CVE;
   in response to a determination that the severity of the CVE exceeds a threshold severity, evaluating whether the application that is using the storage volume is affected by the CVE;
   in response to a determination that the CVE ID is not a valid CVE, that the severity of the CVE does not exceed the threshold severity, or that the application that is using the storage volume is not affected by the CVE, automatically denying override of the storage system management exclusion window to prevent implementation of the requested management operation; and
   in response to a determination that the CVE ID is a valid CVE, the severity of the CVE exceeds the threshold severity, and that the application that is using the storage volume is affected by the CVE, automatically allowing override of the storage system management exclusion window to implement the requested management operation.

2. The method of claim 1, further comprising determining whether the management operation in the request is an additive command used to increase storage; and in response to a determination that the management operation is not an additive command, automatically denying override of the storage system management exclusion window to prevent implementation of the requested management operation.

3. The method of claim 2, wherein additive commands comprise increasing a size of the storage volume, creating a new storage volume, or creating a snapshot copy of the storage volume.

4. The method of claim 1, wherein the storage system management exclusion window is a period of time during which a storage system management system is prevented from implementing configuration operations on a storage system.

5. The method of claim 4, wherein automatic allowing override of the storage system management exclusion window comprises implementation of the management operation of the received request without requiring that a person submitting the request to the storage system management system have sufficient administrative privileges to authorize an override of the exclusion window.

6. The method of claim 1, wherein the CVE database is a public database that identifies, defines, and catalogs publicly disclosed cybersecurity vulnerabilities, and makes the database of known vulnerabilities available over the Internet, or the CVE database is a local copy of the public database.

7. The method of claim 6, wherein evaluating the severity of the CVE comprises parsing a response from the CVE database to determining a CVE severity reported from the CVE database, and comparing the reported severity against the threshold.

8. The method of claim 7, wherein the threshold is high severity.

9. The method of claim 1, wherein evaluating whether the application that is using the storage volume is affected by the CVE comprises:
   determining a type of a type of the application that is using the storage volume; and
   determining if a response from the CVE database identifies the application type as being susceptible to the CVE.

10. The method of claim 9, wherein evaluating whether the application that is using the storage volume is affected by the CVE comprises:
    determining if a publisher of the application type has issued any notice identifying that the application as being susceptible to the CVE.

11. A system for enabling selective automatic override of a configuration management exclusion window, comprising:
    one or more processors and one or more storage devices storing instructions that are operable, when executed by the one or more processors, to cause the one or more processors to perform operations comprising:
    receiving a request to implement a management operation directed to a storage volume hosted by a storage system, the storage volume being used by an application;
    determining whether a storage system management exclusion window exists that currently prevents implementation of the management operation on the storage system;
    in response to determining that the storage system management exclusion window exists, determining whether the request includes a Common Vulnerabilities and Exposures (CVE) Identification (ID);

in response to a determination that the request includes a CVE ID, evaluating a validity of the CVE ID against a CVE database;

in response to a determination that the CVE ID is a valid CVE, evaluating a severity of the CVE;

in response to a determination that the severity of the CVE exceeds a threshold severity, evaluating whether the application that is using the storage volume is affected by the CVE;

in response to a determination that the CVE ID is not a valid CVE, that the severity of the CVE does not exceed the threshold severity, or that the application that is using the storage volume is not affected by the CVE, automatically denying override of the storage system management exclusion window to prevent implementation of the requested management operation; and in response to a determination that the CVE ID is a valid CVE, the severity of the CVE exceeds the threshold severity, and that the application that is using the storage volume is affected by the CVE, automatically allowing override of the storage system management exclusion window to implement the requested management operation.

12. The system of claim 11, the operations further comprising determining whether the management operation in the request is an additive command used to increase storage; and in response to a determination that the management operation is not an additive command, automatically denying override of the storage system management exclusion window to prevent implementation of the requested management operation.

13. The system of claim 12, wherein additive commands comprise increasing a size of the storage volume, creating a new storage volume, or creating a snapshot copy of the storage volume.

14. The system of claim 11, wherein the storage system management exclusion window is a period of time during which a storage system management system is prevented from implementing configuration operations on a storage system.

15. The system of claim 14, wherein automatic allowing override of the storage system management exclusion window comprises implementation of the management operation of the received request without requiring that a person submitting the request to the storage system management system have sufficient administrative privileges to authorize an override of the exclusion window.

16. The system of claim 11, wherein the CVE database is a public database that identifies, defines, and catalogs publicly disclosed cybersecurity vulnerabilities, and makes the database of known vulnerabilities available over the Internet, or the CVE database is a local copy of the public database.

17. The system of claim 16, wherein evaluating the severity of the CVE comprises parsing a response from the CVE database to determining a CVE severity reported from the CVE database, and comparing the reported severity against the threshold.

18. The system of claim 17, wherein the threshold is high severity.

19. The system of claim 11, wherein evaluating whether the application that is using the storage volume is affected by the CVE comprises:

determining a type of a type of the application that is using the storage volume; and determining if a response from the CVE database identifies the application type as being susceptible to the CVE.

20. The system of claim 19, wherein evaluating whether the application that is using the storage volume is affected by the CVE comprises:

determining if a publisher of the application type has issued any notice identifying that the application as being susceptible to the CVE.

* * * * *